(12) United States Patent
Yamakawa et al.

(10) Patent No.: US 6,341,283 B1
(45) Date of Patent: Jan. 22, 2002

(54) APPARATUS FOR DATA DECOMPOSITION AND METHOD AND STORAGE MEDIUM THEREFOR

(75) Inventors: Hiroshi Yamakawa; Hiroyuki Okada; Nobuo Watanabe, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/216,711

(22) Filed: Dec. 21, 1998

(30) Foreign Application Priority Data

May 21, 1998 (JP) ............................................ 10-139831

(51) Int. Cl.[7] ............................. G06F 7/00; G06F 17/30
(52) U.S. Cl. ........................... 707/5; 707/101; 707/203; 379/10; 379/34; 382/181; 382/190; 382/209; 709/243
(58) Field of Search ............................... 707/5, 6, 7, 10, 707/28; 709/222; 379/10, 34; 382/181, 190

(56) References Cited

U.S. PATENT DOCUMENTS

| | | | | |
|---|---|---|---|---|
| 5,615,341 A | * | 3/1997 | Agrawal et al. | 395/210 |
| 5,713,016 A | * | 1/1998 | Hill | 395/605 |
| 5,758,147 A | * | 5/1998 | Chen et al. | 395/606 |
| 5,794,209 A | * | 8/1998 | Agrawal et al. | 705/10 |
| 5,870,748 A | | 2/1999 | Morimoto et al. | 707/101 |
| 5,983,222 A | | 11/1999 | Morimoto et al. | 707/6 |
| 6,189,005 B1 | * | 2/2001 | Chakrabarti et al. | 707/6 |

FOREIGN PATENT DOCUMENTS

| | | |
|---|---|---|
| EP | 0735 497 A2 | 10/1996 |
| JP | 9-134363 | 5/1997 |
| JP | 9-134365 | 5/1997 |

OTHER PUBLICATIONS

R. Agrawal et al.: Mining Association Rules between Sets of Items in Large Database, ACM Cat. No. 0–89791–592, pp. 207–216, May. 1993.*
R. Agrawal et al. "Database mining : A performance Perspective", IEEE Log No. 9212793, Cat. No. 1041–4347, pp. 914–925, Jun. 1993.*
Hiroshi Yamakawa : "Matchability–Oriented Feature Selection for Recognition Structure Learning", IEEE Cat. No. 1015–4651, pp. 123–127, 1996.*
Hirotugu Akaike, "A New Look at the Statistical Model Identification", IEEE Transactional Automatic Control, vol. AC–19, No. 6, Dec. 1974, pp. 716–723.
J. Rissanen, "Universal Coding, Information, Prediction and Estimation", IEEE Trans. on IT, vol. IT–30, No. 4, pp. 629–636, Jul. 1984.
J.R. Quinlan and R.L. Rivest, "Inferring Decision Trees Using the Minimum Description Length Principle" Information and Computation, vol. 80, No. 3, pp. 227–248, Mar. 1989.

* cited by examiner

Primary Examiner—Thomas Black
Assistant Examiner—Jacques Veillard
(74) Attorney, Agent, or Firm—Staas & Halsey LLP

(57) ABSTRACT

The feature quantity selection vectors, indicating which features among those respecting discrete events are to be selected, are fixed. The feature quantity selection spaces taking discrete features as coordinate axes are divided into each segment, and the number of events contained therein is counted. The segments are arranged in order of diminishing event counts contained therein, and the values for functions evaluating the extent of relevance are scanned in the order of segments for which the segments are arranged from the maximum segment counts in the descending order. When the partial situations determined by selection segment counts that are maximum values take evaluation values as their maximum values, even where the feature quantity selection counts are changed, those partial situations are extracted.

36 Claims, 13 Drawing Sheets

| FEATURE EVENT | GENDER | AGE | HEIGHT | WEIGHT | NUMBER OF CIGARETTES SMOKED | ... |
|---|---|---|---|---|---|---|
| 1 | MALE | 29 | 170 | 65 | 20 | ... |
| 2 | FEMALE | 22 | 158 | 43 | 3 | ... |
| 3 | FEMALE | 25 | 161 | 45 | 5 | ... |
| 4 | MALE | 32 | 175 | 80 | 12 | ... |
| 5 | MALE | 18 | 180 | 80 | 0 | ... |
| 6 | FEMALE | 16 | 165 | 41 | 0 | ... |
| 7 | MALE | 41 | 169 | 58 | 30 | ... |
| ... | ... | ... | ... | ... | ... | ... |

FIG. 1

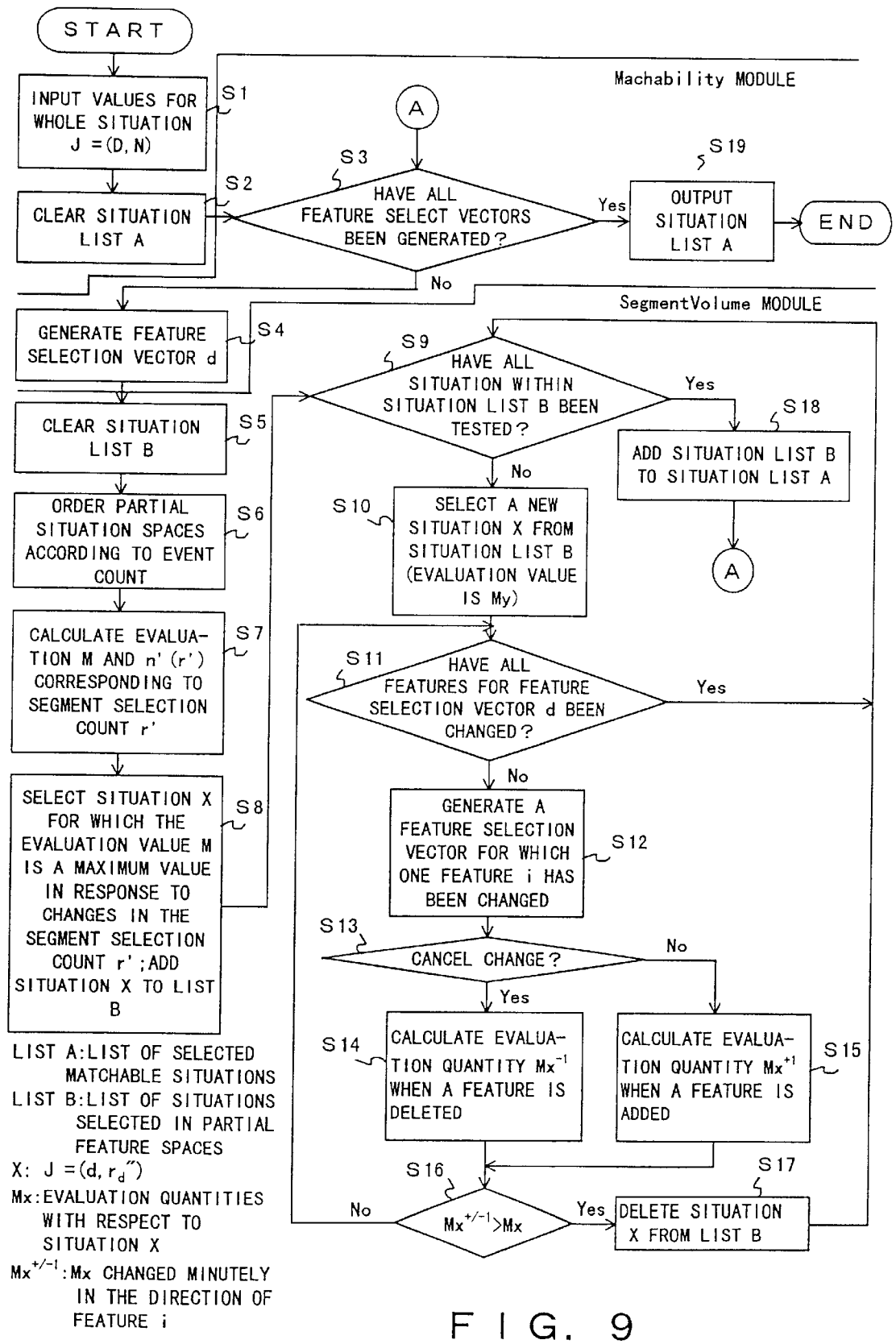
F I G. 9

|  | FEATURE SELECTION VECTOR (d) | SEGMENT TOTAL (Sd) | EVENT COUNT (n) | SELECTED SEGMENT COUNT (r) | EVALUATION VALUE (M) |
|---|---|---|---|---|---|
| WHOLE SITUATION | 3 (ttt) | 1331 | 242 | 232 |  |
| M SITUATION 1 | 2 (tft) | 121 | 132 | 11 | 1.81786 |
| M SITUATION 2 | 2 (ftt) | 121 | 132 | 11 | 1.81786 |
| M SITUATION 3 | 3 (ttt) | 1331 | 22 | 11 | 1.1671 |

F I G. 1 3

APPARATUS FOR DATA DECOMPOSITION AND METHOD AND STORAGE MEDIUM THEREFOR

BACKGROUND OF THE INVENTION

1. Field of the Invention

The present invention relates to a technology for extracting a collection of related data from randomly accumulated data.

2. Description of the Related Art

Extensive and sundry information is today accumulated on computers. Extensive information alone, however, is incomprehensible to human beings. For this reason, data mining and multi-variable analysis receive much attention. The principal purpose of these types of technologies is two-fold:

(1) to extract structures from information and use these structures in, illustratively, estimates; and (2) to compress data to a size amenable to human comprehension, and to make that data visual.

As data accumulation technologies have become less expensive, the increase in blindly accumulated data has brought about qualitative changes in the data. In other words, in the past it was possible to estimate in advance the small number of causal relationships existing in the data sampling performed in respect of data predisposed to a particular purpose. In new data types, however, there are scattered a plurality of causal relationships that have not been anticipated.

Even where an archetypal multi-variable analysis method, such as factor analysis, is used simply to analyze data wherein multiple causal relationships are scattered, it is difficult to obtain valid results. Human beings utilize knowledge relating to the features of the area in which data is accumulated and forecast the types of relationships subsisting in the data. It is thus necessary to divide the problems in advance. This type of task is quite costly and is, therefore, to the extent possible, delegated to computers.

To date, research respecting a technology for extracting or selecting features has been undertaken in the following fields: multi-variable analysis, pattern recognition, neural networks, and case-based reasoning. The term "feature", as herein used, is defined as follows. By way of illustration, assume that height measurements are taken with respect to a plurality of persons. A height measurement or a weight measurement or, alternatively, age or gender information, for one of these persons is a quantity that indicates a feature of that person. Although characterized as a "quantity", gender, for example, is responsive to only two classifications, namely, "male" and "female". It may therefore seem awkward to use the term "quantity" here. However, because it is one factor used to characterize a person, the term is used even in this instance. Furthermore, one record, which is the result of measurements of feature quantities with respect to one person, corresponds to the job of taking measurements with respect to that person. Accordingly, one such record in, illustratively, a database, is referred to as one event. In addition to these events, where a system operation is measured in a time series, it is possible to call measurements performed each hour events. In this case, the quantity characterizing a system operation acquired in one measurement is a feature quantity.

To date, a variety of technologies have been proposed for extracting relevance among data from extensive data. However, most of these are technologies that extract only feature quantities having relevance among data, or that extract events possessed of a specific relevance.

As discussed above, however, recent years disclose a trend toward the blind accumulation of data. It is not always the case that the accumulated data are relevant to all the varieties of the feature quantities obtained. Even where the accumulation is confined to specific varieties of feature quantities, there is no guarantee that the accumulated data will bear relevance to these feature quantities. Accordingly, as regards data that are accumulated blindly, it is necessary to extract a combination of specific events having relevance with respect to a combination of specific feature quantities.

SUMMARY OF THE INVENTION

An objective of the present invention is to provide a technology that extracts mutually relevant data from among data in which a prescribed variety of feature quantities is correlated to a plurality of events, by combining feature quantities and events.

The data decomposition apparatus contemplated by the present invention is a data decomposition apparatus that extracts partial data from whole data, by selecting, with respect to each record and from data which has cataloged a plurality of attributes possessed by each record, the combinations of each event corresponding to each record and the combinations of feature quantities, these quantities comprising the attributes. The data decomposition apparatus according to the present invention further comprises: (a) means for figuring, with respect to combinations of specific feature quantities combinations of specific events, an evaluation value that becomes the standard against which the relevance among data is evaluated; and (b) means for extracting a plurality of partial data for which the evaluation value is the maximum value with respect to changes in both the feature quantity combinations and the event combinations.

The data decomposition method contemplated by the present invention is a data decomposition method that extracts partial data from whole data, by selecting, with respect to each record and from data cataloging a plurality of attributes possessed by each record, the combinations of each event corresponding to each record and the combinations of feature quantities, these quantities comprising the attributes. The data decomposition method according to the present invention further comprises the steps of: (a) figuring, with respect to combinations of specific feature quantities and combinations of specific events, an evaluation value that becomes the standard against which the relevance among data is evaluated; and (b) extracting a plurality of partial data for the evaluation value is the maximum value with respect to changes in both the feature quantity combinations and the event combinations.

In the present invention, the mutually relevant records (events) and the feature quantities associated with each event from the blindly accumulated data are selected and extracted from an assembly of a totality of events and an assembly of feature quantities. Accordingly, it is possible easily to extract mutually relevant data, without human intervention for the purpose of sifting through the data.

This technology can be used effectively as an antecedent process to processes for finding interrelations in a fixed interval of data among data gathered, such as illustratively, multi-variable analysis, data mining, and pattern recognition.

BRIEF DESCRIPTION OF THE DRAWINGS

FIG. 1 discloses a representative data that would be processing object of the present invention.

FIG. 9 is a flow chart describing the processes executed by the software in the preferred embodiment of the present invention.

FIG. 13 discloses the operating test results (2 of 2) for the preferred embodiment of the present invention.

DESCRIPTION OF THE PREFERRED EMBODIMENTS

Figure 2:
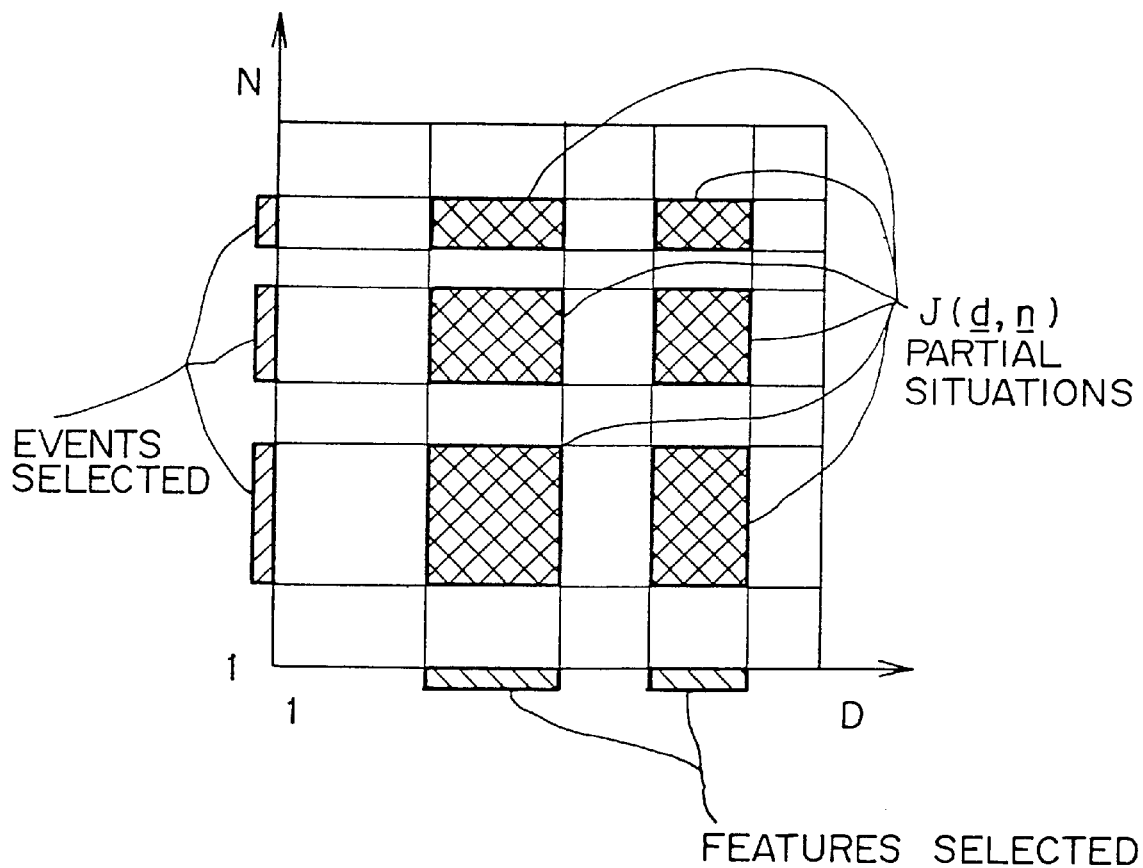
FIG. 2 illustrates the concept of partial situations within a whole situation.

In the present invention, all of the given data are deemed to constitute a matrix of events and feature quantities, hereinafter referred to as a whole situation. A combination of partial assemblies of desired events and partial assemblies of feature quantities is herein referred to as a partial situation.

FIG. 1 discloses an illustrative data matrix of events and feature quantities, which, with respect to the present invention, is referred to as a whole situation.

FIG. 1 also shows the research results obtained with respect to the number of cigarettes smoked in one day by a plurality of persons. In FIG. 1, a record concerning one person with respect to whom the research was conducted represents one event. Up to seven events are disclosed therein. The substance of the research conducted with respect to one person is a feature quantity, and, in FIG. 1, "gender", "age", "height", "weight", and "number of cigarettes" are indicated. A "number of cigarettes" is cataloged as the data representing the number of cigarettes smoked in one day by one person. Generally, there are instances comprising research items other than those described above. Similarly, the number of research subjects can be greater than the number expressed in FIG. 1. In any event, however, an assembly of a combination of all collected feature quantities and all collected events, as well as the combination of all feature quantities and all events, as well as the data indicated by these combinations, is referred to as a whole situation.

A partial situation is a combination of a partial assembly of desired events and a partial assembly of feature quantities, as well as the assembly of data designated by that combination. Assume, illustratively, that a first, a third, a fifth, and a sixth record, as well as "gender", "age", and "number of cigarettes", are adopted respectively as a partial assembly of events and a partial assembly of feature quantities. The instant partial situation comprises these event assemblies and feature quantity assemblies and corresponds to the data enclosed by the broad line in FIG. 1.

The principle of the data decomposition method, according to the preferred embodiment of the present invention, is hereunder explained.

First, the method defines a feature quantity selection vector $\underline{d}$, which indicates whether a feature quantity is to be selected. The selection vector $\underline{d}$ is a vector comprising information indicating whether each type of feature quantity is to be selected. A symbol representing a vector is hereinafter denoted by an alphabetical letter with a line drawn thereunder. The feature quantity selection vector is thus expressed as $$\underline{d}=(d_1, d_2, \ldots, d_D)$$

and is defined as $$d_i(i=1, 2, \ldots, D)=t(rue)/f(alse).$$

D is an all feature quantity count. Setting $d_i$ as "t" indicates that that feature quantity is selected. Alternatively, setting $d_i$ as "f" indicates that that feature quantity is not selected.

When expressing the partial situations shown in FIG. 1, by setting D to 5, for example, the feature quantities "gender" through "number of cigarettes" are caused to correspond respectively, and in order, to $d_1$–$d_5$. The feature quantity selection vector in this case can be expressed as follows:

$$\underline{d}=(t, t, f, f, t).$$

An event selection vector $\underline{n}$, which expresses whether an event is to be selected, is similarly defined. Specifically, this vector is $$\underline{n}=(n_1, n_2, \ldots, n_N)$$

and is defined by $$n_i(i=1, 2, \ldots, N)=t(rue)/f(alse).$$

N is the all event count. Setting $n_i$ as "t" indicates that that event is selected. Alternatively, setting $n_i$ as "f" indicates that that particular event is not selected.

When expressing the partial situations shown in FIG. 1, by setting N to 7, for example, the event selection vector can be expressed as follows, causing $n_1$–$n_7$ to correspond in the numerical order of FIG. 1:

$$\underline{n}=(t, f, t, f, t, t, f).$$

Thus, the feature quantity selection vector $\underline{D}$, when all feature quantities are selected, and the event selection vector $\underline{N}$, when all events are selected, are respectively expressed as follows:

$$\underline{D}=(t, t, t, \ldots, t)$$

and $$\underline{N}=(t, t, t, \ldots, t).$$

It follows, then, that a feature quantity count d (0<d<D) that is to be selected, as well as an event count n (0<n<N) that is to be selected, are denoted respectively as follows.

$$d = \sum_{i=1, d_i=true}^{D} 1$$

$$n = \sum_{i=1, n_i=true}^{N} 1$$

Further, a partial situation designated according to a feature quantity selection vector $\underline{d}$ and an event selection vector $\underline{n}$ is expressed as $J=(\underline{d}, \underline{n})$. A whole situation is therefore expressed as $J=(\underline{D}, \underline{N})$. To designate a partial situation in this way, one should specify a feature selection vector $\underline{d}$ and an event selection feature $\underline{n}$.

FIG. 2 illustrates conceptually how a partial situation is specified, within a whole situation, according to a feature selection vector and an event selection vector.

In the case shown in FIG. 2, the number of selected events $\underline{n}$ is disposed on the vertical axis, and the number of selected feature quantities $\underline{d}$ is disposed on the horizontal axis. The space indicating the actual whole situation is the space spanned by the base vector for the feature quantity selection vector $\underline{d}$ and the base vector for the event selection vector $\underline{n}$. Because this space comprises a multi-dimensional space greater than three dimensions, however, it is infeasible to precisely illustrate this space in a drawing. Accordingly, the concept of specifying a partial situation is explained according to FIG. 2.

If a feature quantity is selected according to a feature quantity selection vector $\underline{d}$, a specified range of events disposed on the horizontal axis is designated (to facilitate the illustration in FIG. 2, a fixed range on the horizontal axis has been designated, as in the case of the feature quantity; strictly speaking, however, this designation is not necessarily accurate). A portion specified by the feature quantity so designated and the event so designated (in FIG. 2, a portion denoted by the lattice-like lines) becomes a partial situation. The partial situations in FIG. 2 are not adjacent to each other, but rather are scattered segments that are combined to form a partial situation. As FIG. 2 shows symbolically, even where a partial situation is designated according to the feature quantity selection vector $\underline{d}$ and the event selection vector $\underline{n}$, the partial situation so designated is not the mass of adjacent data in the space created by the whole situation. Rather, a partial situation comprises an assembly of data distributed throughout the whole situation.

The width of the total space for the feature quantity spanned by the feature quantity selection vector $\underline{d}$ consists of varieties $2^D$. Meanwhile, the width of the total space for the event selection space spanned by the event selection vector $\underline{n}$ consists of varieties $2^N$.

Next, each feature quantity is divided into segments. If the feature quantity is "height", for example, coordinates for "height" values are divided at the appropriate value intervals, in consideration of the consecutive nature of the data. A histogram is representative of a graph so generated. Specifically, consecutive values for the feature quantities are divided into quantity sections on a horizontal axis, and processing is performed from the perspective of the number of events in those sections. This type of discretization is undertaken with regard to all feature quantities. Feature quantities are discretized inherently, illustratively, in the case of "gender". Where the feature quantities are discretized from the beginning ("gender", for instance), and there are only two values that the feature quantities can take, that discretized state is conveniently utilized, as it then exists, as the discretized state.

Figure 3:
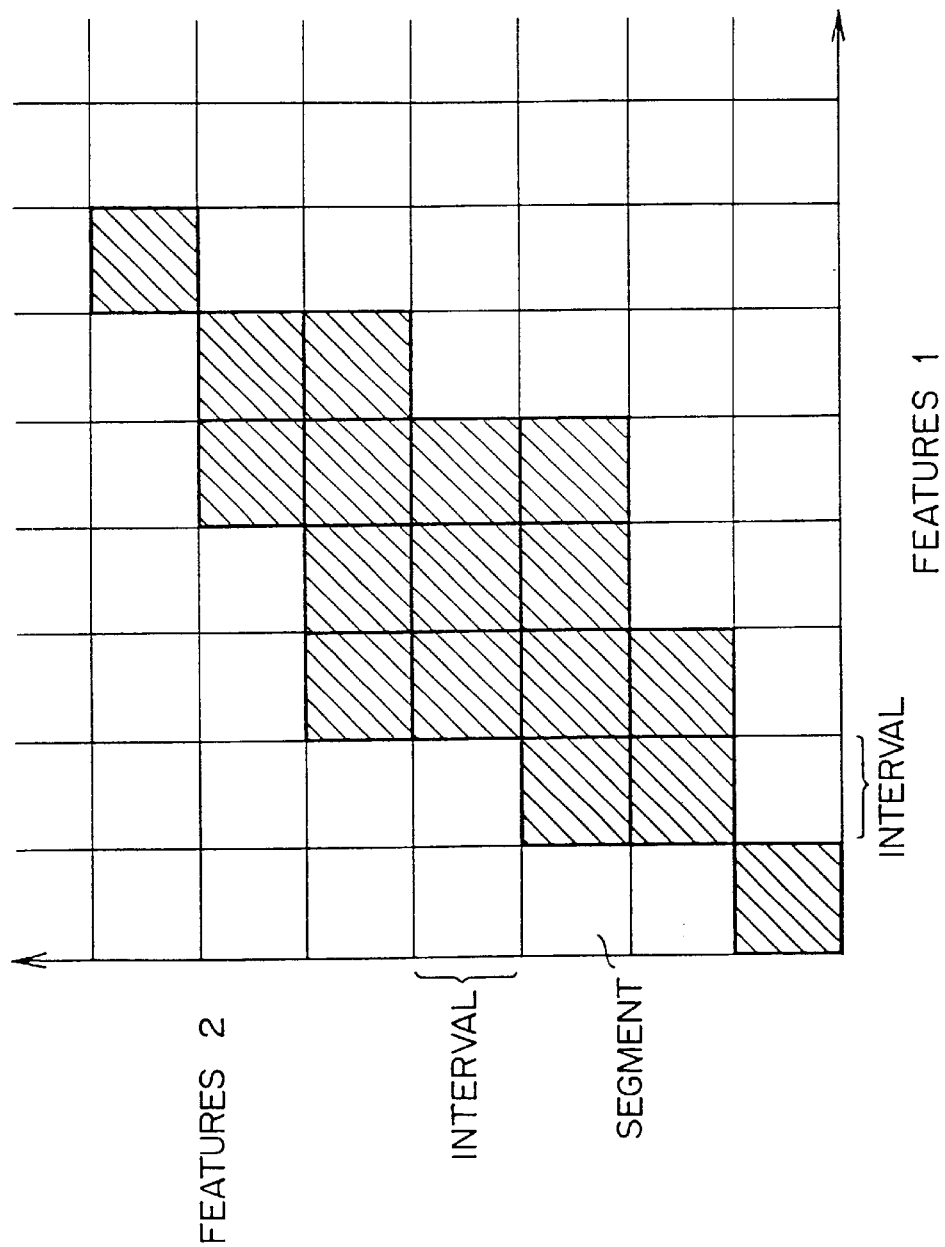
FIG. 3 illustrates the concepts of segment spaces in which feature quantity spaces have been segmented and segment selection vectors.

If all feature quantities are similarly discretized, the feature quantity spaces are divided into segments that are designated according to the sections in which each feature quantity is discretized. FIG. 3 discloses a schematical representation of the appearance of the feature quantity spaces divided into segments, when the feature quantities are a "feature 1" and a "feature 2".

Where, as in FIG. 3, the "feature 1" coordinate axis is divided into a plurality of sections, and the "feature 2" coordinate axis, also, is so divided, the resulting feature quantity space spanned by the "feature 1" and the "feature 2" is divided into a plurality of segments, as shown in FIG. 3. This division is performed with respect to all the features. Therefore, if the number of sections per feature is expressed, illustratively, as $s_i$, the number of segments $S_{\underline{d}}$ contained in the partial features space specified by the feature (quantity) selection vector $\underline{d}$ would be:

$$S_{\underline{d}} = \sum_{i=1, d_i=true}^{D} s_i$$

Next, segment selection vector $\underline{r_d}$, which selects a prescribed number of segments from among segments like those shown in FIG. 3, is defined below.

$$\underline{r_d} = (r_{\underline{d}}1, r_{\underline{d}}2, \ldots, r_{\underline{d}s_{\underline{d}}})$$

where $r_{\underline{d}}i (i=1, 2, \ldots, S_{\underline{d}}) = t(rue)/f(alse)$. In this case, segments included in partial feature spaces are suitably numbered. Setting the $r_{\underline{d}}i$ corresponding to those numbers to "t" means that that segment was selected. Alternatively, setting $r_{\underline{d}}i$ to "f" means that that segment was not selected.

In this instance, the number of segments selected according to the segment selection vector would be $$r_{\underline{d}} = \sum_{i=1, r_{\underline{d}}=true}^{S_{\underline{d}}} 1 (0 < r_{\underline{d}} < S_{\underline{d}})$$

The partial situation designated by the feature selection vector and the event selection vector is here expressed as $J=(\underline{d}, \underline{r_d})$.

If a vector (event count vector) denoting the number of events for each segment, where event selection vector $\underline{n}$ is specified in the partial feature space that is designated according to the same feature selection vector, is made to be $\underline{k_d}(\underline{n})$, that vector can be expressed as follows:

$$\underline{k_d}(\underline{n}) = (k_{\underline{d}}1(\underline{n}), k_{\underline{d}}2(\underline{n}), \ldots, k_{\underline{d}s_{\underline{d}}}(\underline{n})).$$

Here, the following $k_{\underline{d}}1(\underline{n})=0, 1, 2, \ldots (i=1, 2, \ldots, S_{\underline{d}})$ relationship is obtained. The variable i specifies the pre-numbered segments. It is $k_{\underline{d}}i$, moreover, that indicates how many respective events fall within the segments specified by i, where the events have been selected by the event selection vector $\underline{n}$. Adding the number of events found in all segments yields a sum of the events selected by event selection vector $\underline{n}$. The equation below follows therefrom.

$$n = \sum_{i=0}^{S_{\underline{d}}} k_i(\underline{n})$$

Specifying segment selection vector $\underline{k_d}(\underline{n})$ in this way means that a specific territory (a territory may be other than contiguous) in a partial feature space is designated. However, it does not necessarily follow that events are contained within the designated territory. A segment count R$_d$(n) comprising more than one event is indicated by the following equation.

$$R_d(\underline{n}) = \sum_{i=0, K_i(\underline{n})>0}^{S_d} 1(R_d(\underline{n}) \le R_d(\underline{N}) \le S_d)$$

Next, the strength of the correlation among data included in the partial situation identified by each vector is evaluated. The strength of this correlation is termed "matchability".

The disclosure next considers the criteria for selecting the correlated situations from the partial situations J=(d, n), for which the desired events and feature quantities have been selected. Among the properties of the partial situations exhibiting high matchability are a high selected event count, a high selected feature count, and a low volume of information for descriptions.

The all segment count $S_d$ in the partial feature spaces increases monotonically with the selected feature count. The all segment count $S_d$ is utilized, in place of the selected feature count d, as a variable distinguishing the partial situations with high matchability. It is believed that the following states materialize in partial situations with high matchability:

1) a high selected event count n;
2) a high all segment count $S_d$ in selected partial feature spaces; and
3) a low selected segment count $r_d$ in selected partial feature spaces.

Of course, it is equally appropriate to use selected feature count d, as is, as a variable distinguishing the partial situations with high matchability.

Next, in order to express as a function the matchability criteria for evaluating as numerical values the situations believed to materialize in partial situations with high matchability, the following new variables capable of reflecting the nature of the above-described three variables and interpreting the meanings thereof are introduced.

1) n/N: the ratio of event counts included in the partial situations. The function such as that the evaluation value of the function grows in relation to this ratio is sought; 0<n/N<1).

2) n/$r_d$: the average value of the selected event counts for each selected segment in the partial feature spaces (because the number of events included in each selected segment grows where the data exhibit high correlation, it is believed that the matchability evaluation value grows with the number of variables; 1<n/$r_d$).

3) $r_d/S_d$: spatial occupancy ratio for the selected segment count in the partial feature spaces (conceivably, this comprises instances wherein $r_d$ is low, or $S_d$ is high, and is a function wherein the matchability evaluation value grows as this variable is decreased; 0<$r_d/S_d$<1).

It is possible to create evaluation functions for various matchability criteria using variables like those described above. The preferred embodiment of the present invention presumes the following functions.

$$M(n, r_d, S_d, N) = C_1 \log \frac{n}{N} + C_2 \log \frac{n}{r_d} - C_3 \log \frac{r_d}{S_d} \text{ or,} \quad (1)$$

$$M(n, r_d, S_d, N) = \log \frac{n^{C_1+C_2} S_d^{C_3}}{N^{C_1} r_d^{C_1+C_3}}$$

where $C_1$, $C_2$ and $C_3$ are positive constants.

Each of the constants $C_1$, $C_2$, and $C_3$ should be set so as to obtain suitable evaluation values. In this illustrative embodiment, the following values are employed: $C_1$=1.0, $C_2$=0.3, and $C_3$=0.7. Because relative relationships are considered more critical than absolute values, it is believed that the relationship $C_1$: $C_2$: $C_3$=1.0:0.3:0.7 yields results similar to those obtained when the absolute values are set as described above.

Further, although the function giving the above-described matchability evaluation value is set to indicate the existence of relevance among data when the evaluation value is a maximum value, it is appropriate to set the function to indicate the existence of relevance among data when the evaluation value is a minimum value, as well.

It is also possible to utilize an information quantity necessary to describe a partial situation J=(d, n) as another promising evaluation factor in considering matchability. This would include, illustratively, a situation in which one endeavors to maintain $r_d$ d below a fixed level, in consideration of an event count for simply describing a partial situation and the necessary feature quantity count. Further, a method utilizing not simply a feature count d, but rather −r dlog(Sd), is also conceivable.

Matchability is assessed in terms of whether a partial situation maximizes the above-described function (1), which gives the evaluation value. In this case, the totality of both the event selection space and the feature quantity selection space are searched, and it is determined whether these spaces, as presently constituted, yield a maximum function. However, because the combined space width of the selected event space and the selected feature space is $2^{N+D}$, even a computer would require considerable time to make the necessary calculations. Because the all event count N is, generally, higher than the all feature count D, the disclosure below contemplates narrowing the space to be searched to a selected event space comprising a width of $2^N$.

First, to search for a feature selection vector d and an event selection vector n, which maximize the matchability evaluation value, from among a space comprising the feature selection space and the event selection space, the feature selection vector d is fixed, and a search is conducted within the segment space spanned by the segment selection vector $r_d$. As shown by the diagonal lines in FIG. 3, the segment selection vector $r_d$ specifies a partial situation by designating a segment, irrespective of whether or not an event is therein contained. As is discussed hereinbelow, whether or not a matchability evaluation value for a partial situation is the maximum value therefor is determined according to how many and in what way events are contained in a selected segment.

A search within a segment space is further broken down into the determination of a segment selection vector $r_d$, for which there are $2^{Sd}$ types of combinations, and a search of an event selection vector n in a partial situation j=(d, $r_d$), which is designated according to $r_d$.

First, the partial situation J=(d, $r^-_d$), which is designated according to a segment selection vector $r^-_d$ comprising empty segments that contain no events, clearly is not a partial situation in which the matchability evaluation value has a maximum value. The reason for this is as follows. Compared with a partial situation J=(d, $r^+_d$), designated by a segment selection vector comprising more than one event in all segments and corresponding to a partial situation J=($\underline{d}$, $\underline{n}$), itself designated by a certain partial segment, a partial situation designated by a selection vector $\underline{r}^-_d$ comprising the same number of events and further comprising empty segments, experiences growth in the selected segment count $r_d$. However, because the other variables that determine matchability remain the same, the matchability evaluation value is diminished.

The condition is now added that, with respect to a segment selection vector $r_d$, segments containing no events are not to be selected, thus yielding $r_{d^i}$=t(rue) if $k_{d^i}(n)>0$ $r_{d^i}$=f(alse) other.

Accordingly, the segments that contain no events are removed from among the segment selection vectors. Because the segment count for segments containing more than one event with respect to all events is $R_d$ (n), and because the scope of the search is confined to segment selection vectors $r_d$ that have selected exclusively segments containing one event or more, the resultant combination is 2 $\underline{x}$ (x=$R_d$, ($\underline{N}$)). This means that, when all events are selected, the search is confined to the number of segment combinations containing at least one event. To the extent that a selected feature grows in size, there exists in a partial feature space a plurality of segments that are perpetually empty. Therefore, $R_d(\underline{N})<S_d$, and, at this stage, the search space has been significantly reduced.

If the $i^{th}$ selected segment is focussed on when a certain segment selection vector $r_d$ is specified, selecting an event selection vector that designates a partial situation in which the number of included events is fewer than $k_d i(\underline{N})$ reduces the selected event count n only, without affecting the selected segment count $r_d$. The matchability evaluation value is, therefore, reduced. Namely, it is Pareto optimal only when one selects an event selection vector in which the number of events included in all selected segments becomes the number of events $k_d i(N)$ included when all event selection vector $\underline{N}$ is selected. Searching of the other event selection vectors is unnecessary.

Specifically, it is useful to perform a search exclusively for one event selection vector constituted as follows:

$k_{d^i}(\underline{n})=k_d(\underline{N})$ if $r_{d^i}$=true $k_{d^i}(\underline{n})$ =0 if $r_{d^i}$=false The width of the overall search space after designating the feature quantity selection vector d becomes $1\times2^x=2^x$(x R $_d(N)$), because the event selection vector is fixed at one when the segment selection vector is established at one.

Figure 4:
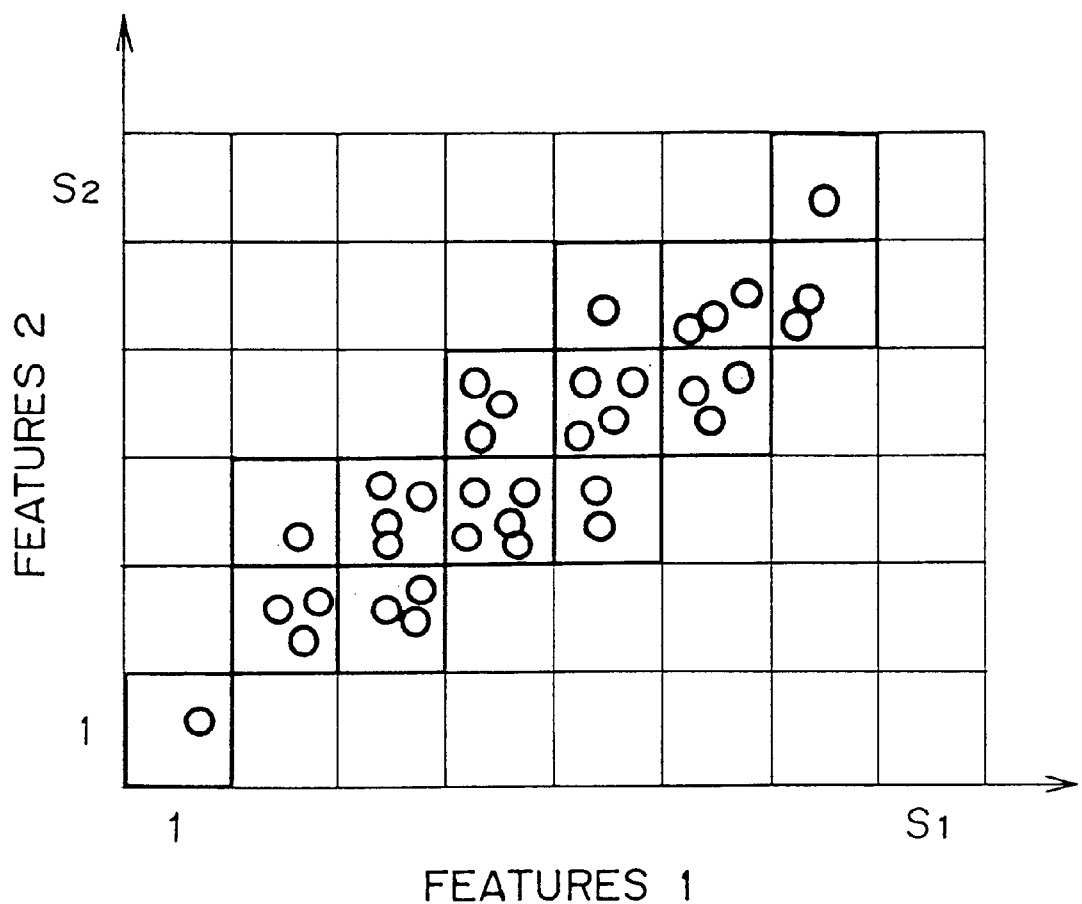
FIG. 4 illustrates the concepts of the selection of segments within segment spaces and the events contained in each segment.

FIG. 4 is a schematic representation showing how the selected segments and the selected events exist in feature selection spaces.

The squares defined by thick lines in FIG. 4 represent the selected segments, and each event is depicted by a circle. Here, the segments containing no events are not selected, and the number of events residing in each segment is the same as the number of events contained in the subject segments when a partial situation is designated by the all event selection vector $\underline{N}$.

Figure 5:
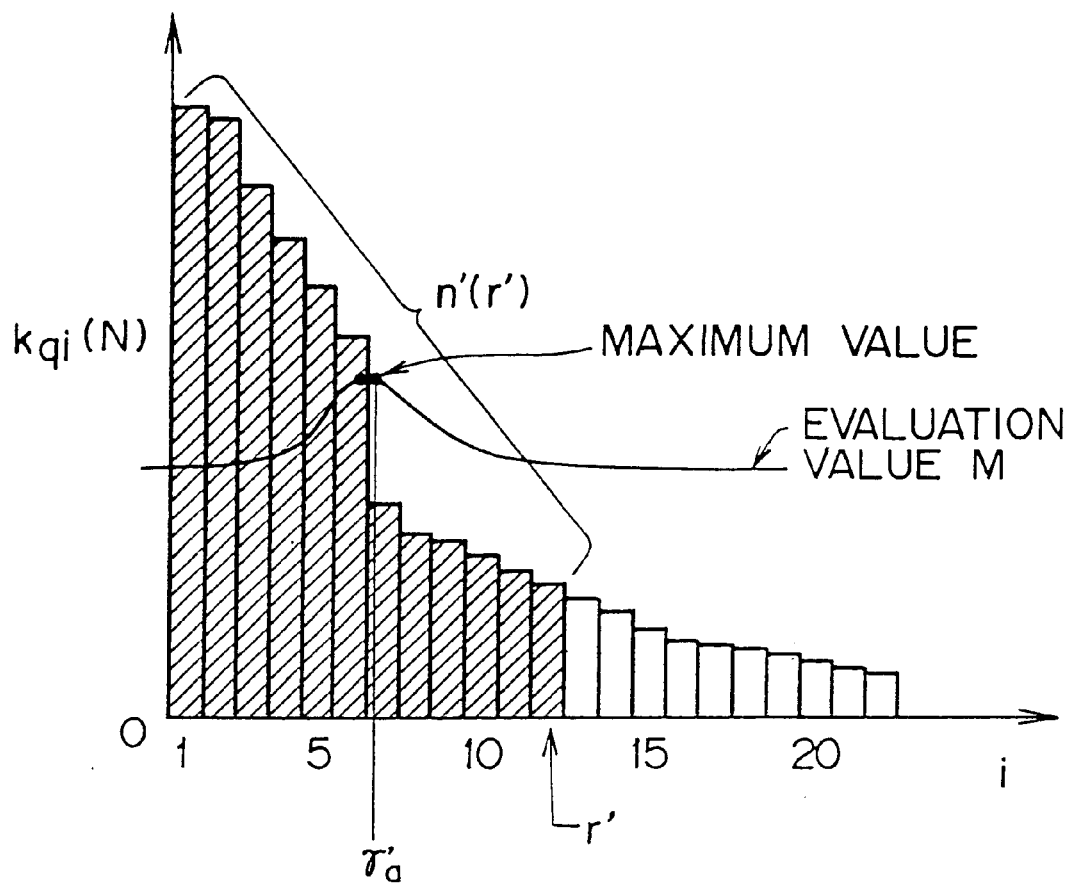
FIG. 5 describes a method for searching the maximum values for the matchability evaluation values.

Next, as is shown in FIG. 5, an index arrangement q1, q2, . . . , $q_{R_d(\underline{N})}$, ordering from the highest to the lowest value each component (or element) $k_d i(\underline{N})$ of a maximum event count vector (an event vector indicating how many events are contained in each segment when all segments are selected) is defined. Specifically, this arrangement may be expressed as follows:

$$k_{dq1}(\underline{N}) \geq k_{dq2}(\underline{N}) \geq \cdots \geq k_{dqR_d(\underline{N})}$$

Here, an assembly of segment selection vectors $r_d$ (r') is considered, for which the selected segment count is r'. The vectors contained in this assembly are limited to the number of combinations for selecting a quantity r' from among a quantity $R_d$. ($\underline{N}$). Because the selected segment count r' is fixed among the segment selection vectors contained in this assembly, clearly, the matchability evaluation value in the segment selection vectors $\gamma_d(r')$ (maximum segment selection vectors) will increase.

The maximum segment selection vector $\gamma_d(r')$ is a segment selection vector which, as shown below, collects the segments comprising as many event counts $k_d i(\underline{N})$ as possible.

$\gamma_d(r')=\{r_{d^i}\}:r_{d^i}$=true (if i$\leq$r'), $r_{d^i}$=false (if i>r')

The event count n'(r') in this particular case is:

$$n'(r') = \sum_{i=0, r'_d=true}^{S_d} k_i(\underline{N})$$

$$n'(r') = \sum_{i=1}^{i\leq r'} K_{qi}(\underline{N})$$

The preceding discussion discloses that the method of searching for a maximum matchability evaluation value within a partial feature space, subsequent to establishing a feature selection vector $\underline{d}$, is a process for searching for the maximum value of an evaluation quantity M (n'(r'), r', $S_d$, N), when the selection segment count r' is changed from 1 to $R_d$ ($\underline{N}$). If the segment selection vector in the maximum value obtained according to this search is made to be $r_d$", the partial situation J=($\underline{d}$, $r_d$") becomes a candidate for a collection of data that display mutual relevance. By having thus employed ordering, it is possible to reduce the combinations for searching maximum values to $R_d(\underline{N})$.

The rearrangement of each element of the maximum event count vectors is shown in FIG. 5. As shown in the same figure, each element for the maximum event count vectors is rearranged from the highest value to the lowest value, and a matchability evaluation value M is calculated with r' moved. Where, as in FIG. 5, the value of $k_{qi}(\underline{N})$ drops sharply, the evaluation value M carries its maximum value. Publicly known technology can be used to obtain the maximum value for the evaluation value M.

Next, the disclosure examines whether each selected candidate partial situation, J=($\underline{d}$, $r_d$"), remains a maximum value with respect to directional changes for the number of all feature quantity types, D. Here, because each element of a feature quantity selection vector is true/false, the feature quantity selection vector when a $i^{th}$ feature, not selected, is added in the feature quantity selection vector $\underline{d}$ is made to be $\underline{d}^{+i}$. Additionally, the feature quantity selection vector when a selected $i^{th}$ feature selection vector has been omitted in the feature quantity selection vector $\underline{d}$ is made to be $\underline{d}^{-i}$. A method of calculating a matchability evaluation value in each case is next explained.

(1) Matchability Evaluation when a Feature Quantity is Added.

In order to calculate the matchability evaluation value in the partial situation J=($\underline{d}^{+i}$, $r_d$"), the four variables that make up that argument are considered. First, because the all segment count is augmented to the extent of the segment count for the selected feature quantity, the segment count following the augmentation is $S_{\underline{d}}^{+i}=S_{\underline{d}}\cdot Si$. The event selection is unchanged, and thus remains n'($r_{\underline{d}}$"). Likewise, the all event count N is unchanged.

To obtain the selected segment count $r_{\underline{d}}^{+i}$" in a expanded partial feature space, one must know the selected segment count $r_{\underline{dj}}^{+i}$" required when individual events $k_{\underline{d}j}(N)$ saved within the $j^{th}$ segment selected in $r_{\underline{d}}$" are arranged in the $i^{th}$ feature segment. Some calculation is necessary to derive this count. This calculation is hereinafter discussed. If $r_{\underline{d}}^{+ij}$ is known, the count $r_{\underline{d}}^{+i}$" can be obtained by the following equation.

$$r_{\underline{d}}^{\prime\prime+i} = \sum_{j=1,r_{\underline{d}j}^{\prime\prime}=true}^{S_{\underline{d}}} r_{\underline{d}j}^{\prime\prime+i} \qquad (2)$$

From this equation, a matchability evaluation value $M^{+i}$ in the partial situation $J=(\underline{d}^{+i}, r_{\underline{d}}$"), to which feature i has been added, is expressed by the following equation.

$$M^{+i}(n'(r_{\underline{d}}"), r_{\underline{d}}", S_{\underline{d}}, N)=M\ (n'(r_{\underline{d}}"), r_{\underline{d}}^{+i"}, S_{\underline{d}}^{+i}, N)$$

(2) Matchability Evaluation when a Feature is Deleted

To calculate the matchability evaluation in the partial situation $J=(\underline{d}^{-i}, r_{\underline{d}}$"), four variables are considered. The all segment count becomes $S_{\underline{d}}^{-i}=S_{\underline{d}}/Si$, as the segment count is reduced by the number of segments for deleted feature quantities. Because the event selection is unchanged, the selected event count remains n' ($r_{\underline{d}}$"). Similarly, the all event count N is not affected.

To obtain the selected segment count $r_{\underline{d}}^{-1}$" in a condensed partial feature space, a segment selection vector condensed in that space is defined as follows.

$$r_{\underline{d}}^{\prime\prime-i} = \left( r_{\underline{d}1}^{\prime\prime-i}, r_{\underline{d}2}^{\prime\prime-i}, r_{\underline{d}3}^{\prime\prime-i}, \ldots, r_{\underline{d}s_{\underline{d}}^{-i}1}^{\prime\prime-i} \right) \qquad (3)$$

$$r_{\underline{d}j}^{\prime\prime-i} = t(rue)/f(alse)$$

Each element of the segment selection vector $r_{\underline{d}}$" occupies one segment in the partial feature space. Given that the condensed segment selection vector expressed according to equation (3) is also a partial space for that vector, it is possible to project from the vector $r_{\underline{d}}$" to the vector $r_{\underline{d}}^{-1}$". If, among the projected vector elements, there is even one true element, each element of the condensed segment selection vector is set to true.

The selected segment count $r_{\underline{d}}^{-1}$" in this condensed segment selection vector is then given by the following equation.

$$r_{\underline{d}}^{\prime\prime-i} = \sum_{j=1,r_{\underline{d}j}^{\prime\prime-i}=true}^{S_{\underline{d}}^{-1}} 1$$

From the foregoing, a matchability evaluation $M^{-i}$ for the partial situation $j=(\underline{d}^{-i}, r_{\underline{d}}$"), from which a feature i has been deleted, is expressed by the following equation.

$$M^{-i}(n'(r_{\underline{d}}"), r_{\underline{d}}, S_{\underline{d}}, N)=M\ (n'(r_{\underline{d}}"), r_{\underline{d}}^{-1"}, S_{\underline{d}}^{-1}, N)$$

If, when the selected feature quantity is varied minutely, a thus-obtained matchability evaluation $M^{+i}$ or $M^{-i}$ is greater than M, the partial situation $J=(\underline{d}, r_{\underline{d}}$") is not one which is to be extracted, because the partial situation in question is not a maximum value. Conversely, if the partial situation in question were a maximum value, the partial situation in question would constitute a situation that is to be extracted.

Figure 6:
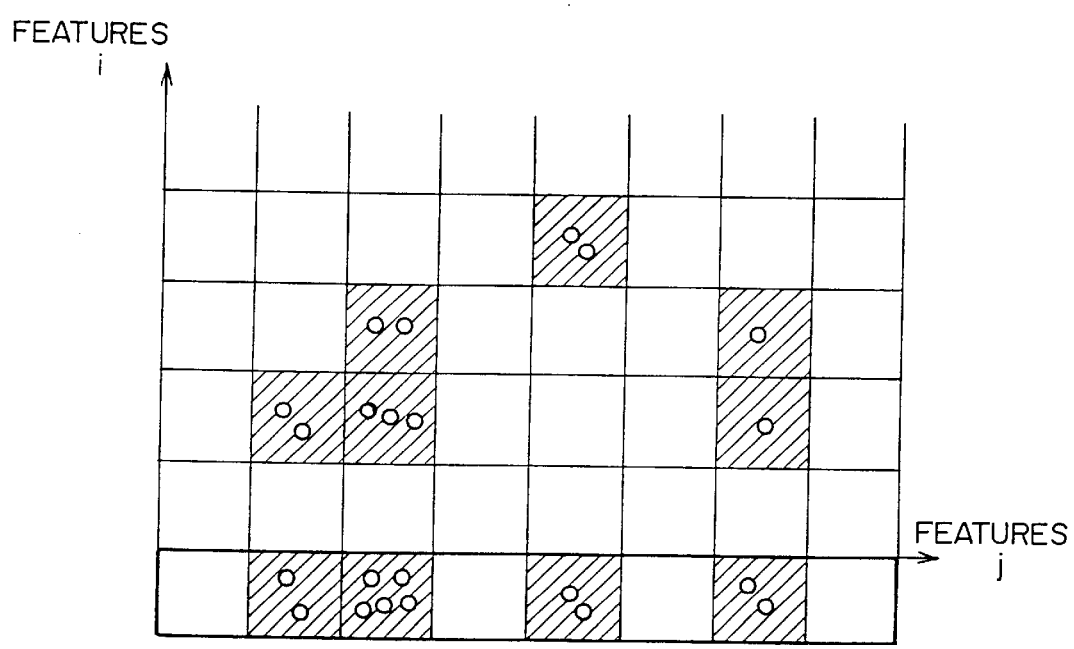
FIG. 6 illustrates conceptually the changes in the segment selection states resulting from the addition or, alternatively, the deletion of feature quantities.

FIG. 6 depicts conceptually how a selected segment changes when a feature i is either added to, or deleted from, a partial situation.

In this figure, feature quantity j is established as the feature that does not change. A segment selected on the premise that the feature i initially is not selected and that the segment set in the direction of feature j only is represented by the diagonal lines. The circles in FIG. 6 represent discrete events. If the feature i is added, the events stored in the feature j-direction segments are dispersed in the direction of feature i. Because the differences in each event attributable to the difference in feature quantity i are not manifest when only the direction of feature j is contemplated, the addition of the feature quantity i ensures that the events disposed in the same segment are distributed in the direction of the feature quantity i.

Accordingly, when the feature quantity i is added, a new selected segment count must be determined, taking account of the dispersion of these kinds of events. If, on the other hand, a feature i is deleted, each event that was dispersed in the direction of the feature quantity i, if these events are included in the same segment in the direction of the feature quantity j, are collected within that segment. Accordingly, when a condensed segment selection vector is generated, the segments disposed in the direction of the feature quantity i are deleted. When there are a plurality of segment selection vectors that have selected the same segment disposed in the directions of different feature qualities, these are consolidated into one condensed event selection vector. Using this condensed segment selection vector, the condensed selected segment count should be calculated.

The foregoing explanation discloses a method for extracting partial situations having inter-data relevance, when a feature selection vector $\underline{d}$ is fixed. Further, by undertaking a whole search with respect to a combination of feature selection spaces $2_D$, a plurality of partial situations is extracted.

Figure 7:
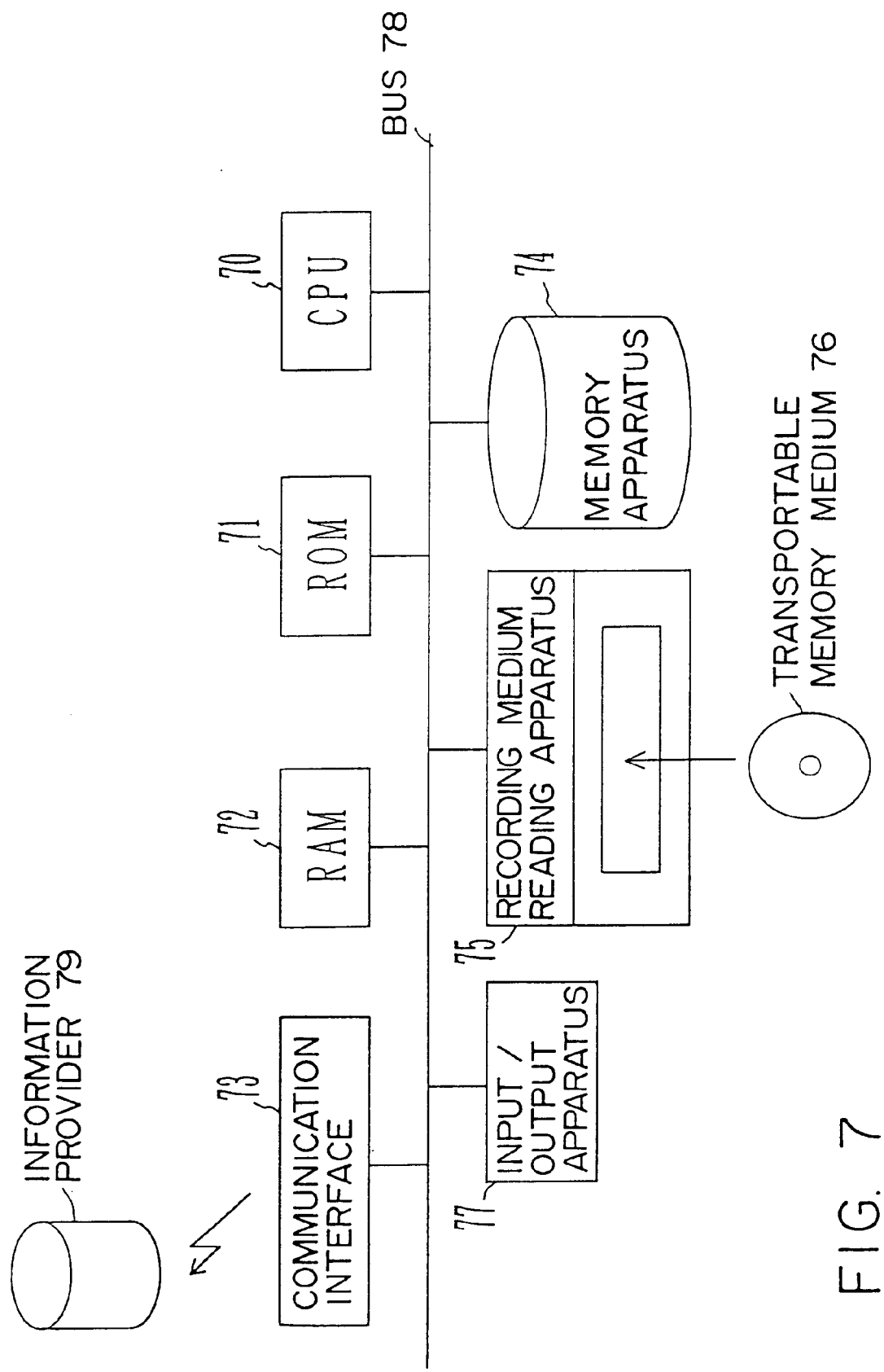
FIG. 7 discloses, by way of illustration, a hardware structure necessary to practice the present invention.

FIG. 7 shows the hardware configuration of an apparatus for executing programs that perform the processes of this illustrative embodiment.

In this configuration, a CPU 70, which executes program commands, is linked to bus 78. This configuration proceeds with processing while exchanging data with other apparatuses. To bus 71 are connected: ROM 71, RAM 72, a communication interface 73, a memory apparatus 74, an apparatus for reading recording medium 75, and an input/output apparatus 77.

On ROM 71 is recorded, illustratively, an operating system that comprises the basic program for causing the apparatuses shown in FIG. 7 to operate under the control of the CPU 70. The CPU 70 reads the OS from ROM 71, when power is applied to the apparatuses shown in FIG. 7, and facilitates the input of commands from the input/output apparatus 77 and the output of data to input/output apparatus 77.

Input/output apparatus 77 comprises input devices—e.g., a keyboard or a mouse—as well as output devices, a display monitor or printer being representative thereof. Further, the input/output apparatus 77, among other things, inputs data that are to be processed using the method of the present invention and outputs data so processed.

Connected to bus 78, RAM 72 deploys programs to be executed by the CPU 70 so that those programs can be executed and stores those programs. In reading the programs stored in RAM 72, the CPU 70 processes data and causes the processing results to be stored temporarily in RAM . Data that are to be processed thereafter are similarly stored in RAM 72. The processed data that are temporarily stored in RAM 72 are tendered to a user via the output apparatus 77.

Programs that perform the processes of the present invention are recorded on a memory device 74, a hard drive being illustrative thereof, or on a transportable memory medium 76. The subject programs are sent from the memory apparatus 74, or, alternatively, from a memory media reading apparatus 75, which reads the transportable memory medium 76, to RAM 72, and the CPU 70 is set to an execute-ready state. The transportable memory medium 76 is, illustratively, a CD-ROM or a floppy disk, and the memory medium reading apparatus 75 comprises, by way of example, a CD-ROM drive or a floppy disk drive.

If the apparatuses shown in FIG. 7 are employed as dedicated devices for the present invention, it is appropriate to store in advance the subject programs in ROM 71. It is to be noted, however, that, because ROM 71 cannot be overwritten, hardware so configured is not amenable to remedial action indicated if the case of program-intrinsic problems or where program adjustment is required for processing convenience.

Communication interface 73 is connected to bus 78. The system is configured to facilitate the receipt of data and programs by way of communication circuits. It is possible to configure the system so that the programs of the present invention can be downloaded from an information provider 79 using the communication interface 73. After being stored on the memory device 74 or the transportable memory medium 76, the subject programs can be deployed in RAM 72 and used. It is conceivable, further, that the system be used to receive data to be processed from an information provider 79 and, subsequent to the processing of the data, transmit the processed data by way of the communication interface 73 to appropriate communication partners. It is also feasible to construct a LAN or like network among information providers and execute on a network the programs of the present invention.

Figure 8:
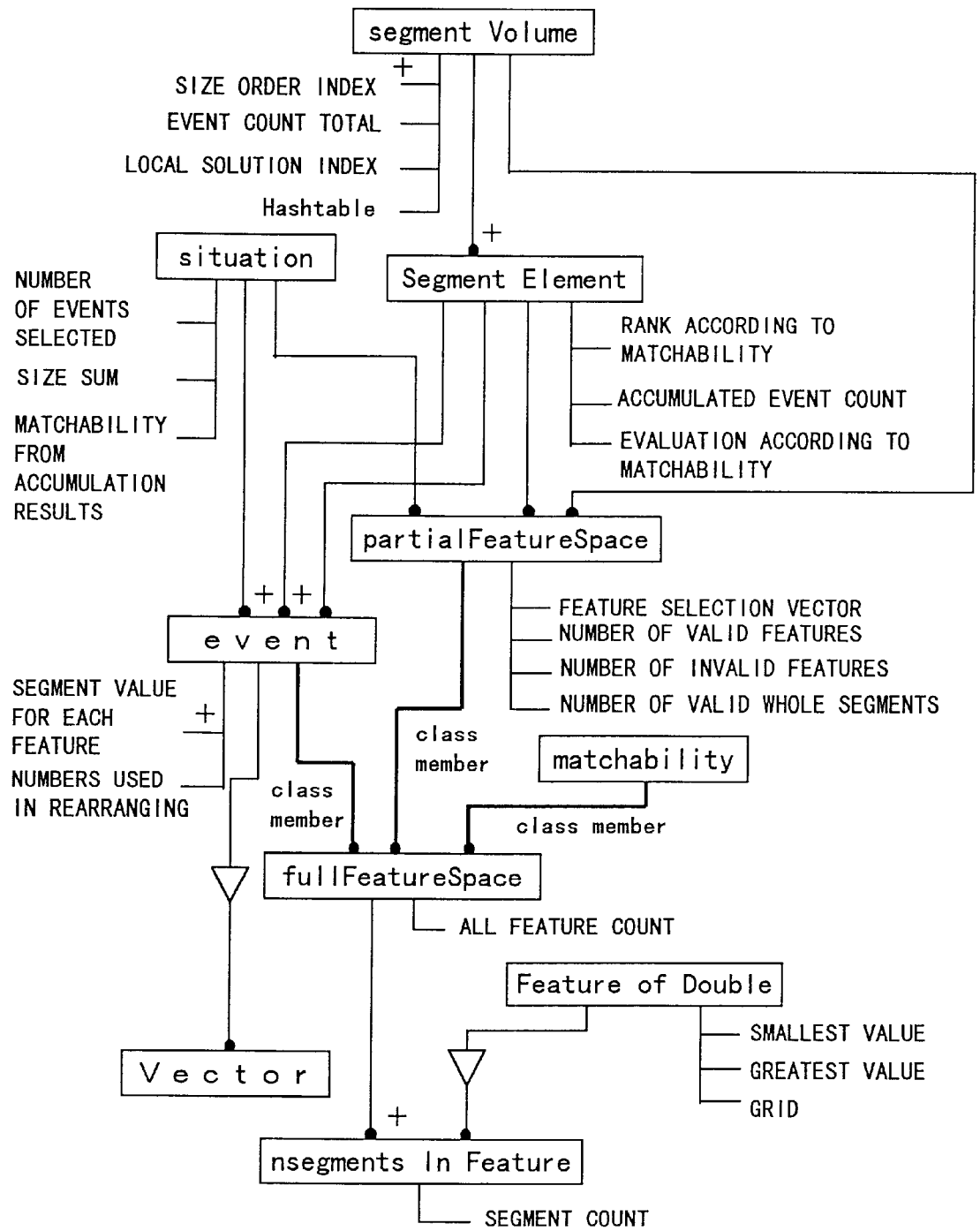
FIG. 8 discloses the software configuration for the preferred embodiment of the present invention.

FIG. 8 illustrates the relationships among the modules that make up the programs for executing the processes of the present invention.

The configuration of the programs, shown in FIG. 8, represents the relationships among the program modules, which are described in object oriented language, and the lines linking the modules indicate that, as between the modules joined by a line, a relationship employing the lower module depends from the upper module. An outgoing line from a module indicates what types of variables that particular module has.

The "vector" module appearing in FIG. 8 generates a model of vector-format data, as a data format, defines the basic configuration of data structures, and comprises a variable number of elements.

The "event" module inherits vector-format data defined by the "vector" module as a data format and is utilized to express one event. The "event" module has, as variables, numbers utilized in arranging and reordering segment values for each feature quantity.

The "nsegmentsInFeature" module comprises a class for expressing segment count for each feature quantity. Using this class, or a class inheriting this class, a user sets segment counts in each feature quantity, in order to produce segments responsive to feature quantity attributes.

The "featureOfDouble" module inherits classes defined by the "nsegmentsInFeature" module. This module causes a user to input a minimum value and a maximum value for a feature quantity, as well as a grid width therefor, and establishes the parameters for dividing a feature quantity space into segments.

The "fullFeatureSpace" module is a class having information concerning the aggregate feature quantity space. This module holds as a variable the all feature quantity count and holds information relating to features as arrangements.

The "fullFeatureSpace" module is one of the class members to which the "matchability" module refers. Using the information concerning feature quantities held by the "fullFeatureSpace" module, the "matchability" module performs processing for calculating matchability.

The "partialFeatureSpace" module refers to the "fullFeatureSpace" module as a class member and possesses information relating to partial feature spaces. The feature quantity selection vectors are the substance of this module. In addition to the feature quantity selection vectors, which are the substance of the "fullFeatureSpace" module, this module comprises, illustratively, the following variables: selected (valid) feature counts, feature counts not selected (invalid), and aggregate segment counts for valid feature spaces.

The "segmentElement" module holds the event vectors, which become segment elements, and, in addition to employing the event classes to hold references to selected partial feature quantity spaces or positions within the partial feature quantity spaces, holds rankings ordered according to the event counts (sizes) comprising selected events internally, the accumulated event count where a specific segment count r' is set, and the evaluation values according to matchability.

The "segmentVolume" module comprises the substance of the segment space that is configured as a primary original arrangement for the "segmentElement" module and performs processing among the segment selection spaces with respect to the designated feature quantity selection vectors. This module is called from the "matchability" module and has the following illustrative variables: the references to partialFeatureSpace that designates selected partial spaces; a hash table for indexing segments generated automatically according to processing expediency; an index according to the number (size) of events contained in a segment, and a total event account; and a local solution index (event vectors expressing a maximum value when a feature quantity vector is fixed).

The "situation" module inherits the "vector" module classes and holds events as an element thereof. Additionally, it holds as variables the number of segments selected, the total segment size, and a matchability evaluation value from accumulation results.

Although not shown in FIG. 8, the call relationships for these modules and the main routines for carrying out supplemental process are provided. Each of the modules discussed in connection with FIG. 8 is called by a main routine. The process flow for when a main routine executes processes using each of these modules is explained below.

FIG. 9 discloses the flow of processes executed by the program of the preferred embodiment. First, a main routine is activated when processing is begun, and the values necessary for the situation $J=(\underline{D}, \underline{N})$ are input at step S1. Here, the data format used is the data structure provided by the "situation" module shown in FIG. 8. With the feature quantity selection vector as $\underline{D}$ and the event selection vector as $\underline{N}$, the data format generates data that express the whole situation.

Next, in step S2, the main routine clears situation list A. Situation list A is a list of selected matchable events (a combination of events and features recognized as having mutual relevance and events) and its format is that of a list enumerating matchable situations using a data structure provided by the "situation" module shown in FIG. 8.

At the conclusion of processing through step S2, the "matchability" module is called from the main routine, and, in step S3, it is decided whether all of the feature selection vectors $\underline{d}$ have been generated. Immediately after the program is activated, the system proceeds to step S4, because, at that point, the feature selection vectors have not yet been determined, and the matchability evaluations have not yet been performed. In step S4, the feature selection vectors $\underline{d}$ are generated, and the "segmentVolume" module is called. The program then proceeds to step S5.

The situation list B is cleared in step S5. The situation list B is a list of situations selected in specific partial feature spaces. In terms of its population, the situation list B holds the situations as vectors that take as an element the r' value for each situation shown in FIG. 5. These situations are formed according to the inherited data structure models provided by the "vector" module in FIG. 8. In step S6, the segments for the partial feature spaces are ordered according to an event count $k_d i(\underline{N})$. The segment counts for each feature space are held by the "fullFeatureSpace" module, which possesses the "nsegmentsInFeature" module as an arrangement of inherited classes. Further, the feature selection vectors generated in step S4 are input to the "partialFeatureSpace" module. The "segmentElement" module refers to "partialFeatureSpace" information and holds the "event" module information. The "segmentVolume" module possesses the "segmentElement" arrangements, figures the event count contained in each segment (segment size), and sorts the segments by size (in order of diminishing size.

Next, r', shown in FIG. 5, is set in step S7, and an event count n' (r') corresponding to this r' and a matchability evaluation value M are calculated. In step S8, a situation X (X is the situation wherein J=($\underline{d}$, $r_d''$)), which becomes the maximum evaluation value M, is selected according to the changes in the segment selection count r' and is added to the situation list B. Specifically, r' is recorded in the situation list B, which contains the vector data structures.

As was stated in the explanation concerning the drawings through and including FIG. 5, how the segments taking the evaluation value as a maximum value are chosen when the feature selection vectors are fixed, as well as how the events are chosen when the feature selection vectors are fixed, is tied to the disposition of all vectors in the segment spaces and the finding of an r' that maximizes the evaluation value, when each segment is ordered according to the size of the count of the vectors contained therein, and the r' in FIG. 5 is changed. Therefore, the segments arranged to the left of the $Y'_a$ in FIG. 5 are the segments that have been selected. Because the segments are arranged in order of diminishing size, how the events are distributed determines which segments are to be selected. If the way in which the events are distributed does not change, which of the segments and which of the events are selected turns wholly on the determination of r'. It is to be noted that the number of r's is not necessarily one.

Proceeding to step S9, it is decided whether all the situations in the situation list B have been tested. The term "test", as here used, refers to a determination of whether the situations included in the situation list B maximize the evaluation value, notwithstanding the changes made to the feature selection vectors. If testing has not been performed with respect to all the situations, a next situation X is selected from the situation list B in step S10. Here, the evaluation value is Mx. In step S11, it is decided whether all the features for the feature selection vectors $\underline{d}$ have been changed. Specifically, it is determined whether all "true" and "false" for the feature selection vector elements have been substituted and whether the variations in evaluation values have been tested. If the judgment is "NO", the process advances to step S12.

In step S12, a feature selection vector for which one feature i has been changed is generated. The process then advances to step S13. In step S13, it is determined whether the variation of the feature i converts ("excision") a "true" into a "false". In the case of an excision, the process proceeds to step S14, and, in the case of no excision, the process advances to step S15. Step S14 calculates the evaluation value $Mx^{-i}$, and step S15 calculates the evaluation value $Mx^{+1}$ in the case of the addition of features. The method for calculating the selected segment count $r_d''$, which is required to calculate the evaluation value when features are added, is hereunder described.

When the respective evaluation quantities are computed in either of step S14 or step S15, it is determined in step S16 whether the evaluation quantities computed in either of step S14 or step S15 are greater than those prior to the changing of the feature selection vectors. If it is determined that these values are greater, the situation X continues to be a candidate for a matchable situation and, therefore, the process returns to step S11 and repeats the process until it has finished changing all the features for the feature selection vectors $\underline{d}$. Once all the features have been changed, the present situation X, the subject of the present investigation, is judged to be a matchable situation, and, therefore, the process returns to step S9 to determine whether all the situations in the situation list B were tested. Where the testing unfinished, the program performs the processing according to steps subsequent from S10. When the testing is completed, the situation list B is in step S18 added to the situation List A, and the program returns to step S3 (wherein the "matchability" module is called). The situation list A is an arrangement of the situation modules and lists events and features. Because the situation list B stores only the selected segment count r $\underline{d}''$, some additional processing is required here. This processing is hereunder explained.

Where it is determined in step S16 that the evaluation quantity computed in either of step S14 or step S15 is greater than the evaluation quantity prior to the changing of the feature selection vectors, it is not possible for the above-described situation X to become a matchability situation. Therefore, the situation X is in step S17 deleted from the situation list B. The program then proceeds to step S9. Only the situations remaining in the situation list B, after thus changing the feature selection vectors for all the situations in the situation list B and testing for matchability situations, are added to the situation list A (step S18), and the program returns to step S3.

In step S3, it is determined whether the processing described above has been performed for all the feature selection vectors, and, if this processing has not been performed, the processing pursuant to step S4 and subsequent steps is carried out. When it is determined in step S3 that the processing for all the feature selection vectors has been finished, processing is brought to a close by proceeding to step S19 and there either displaying or printing out the situation list A as a processing result.

Figure 10:
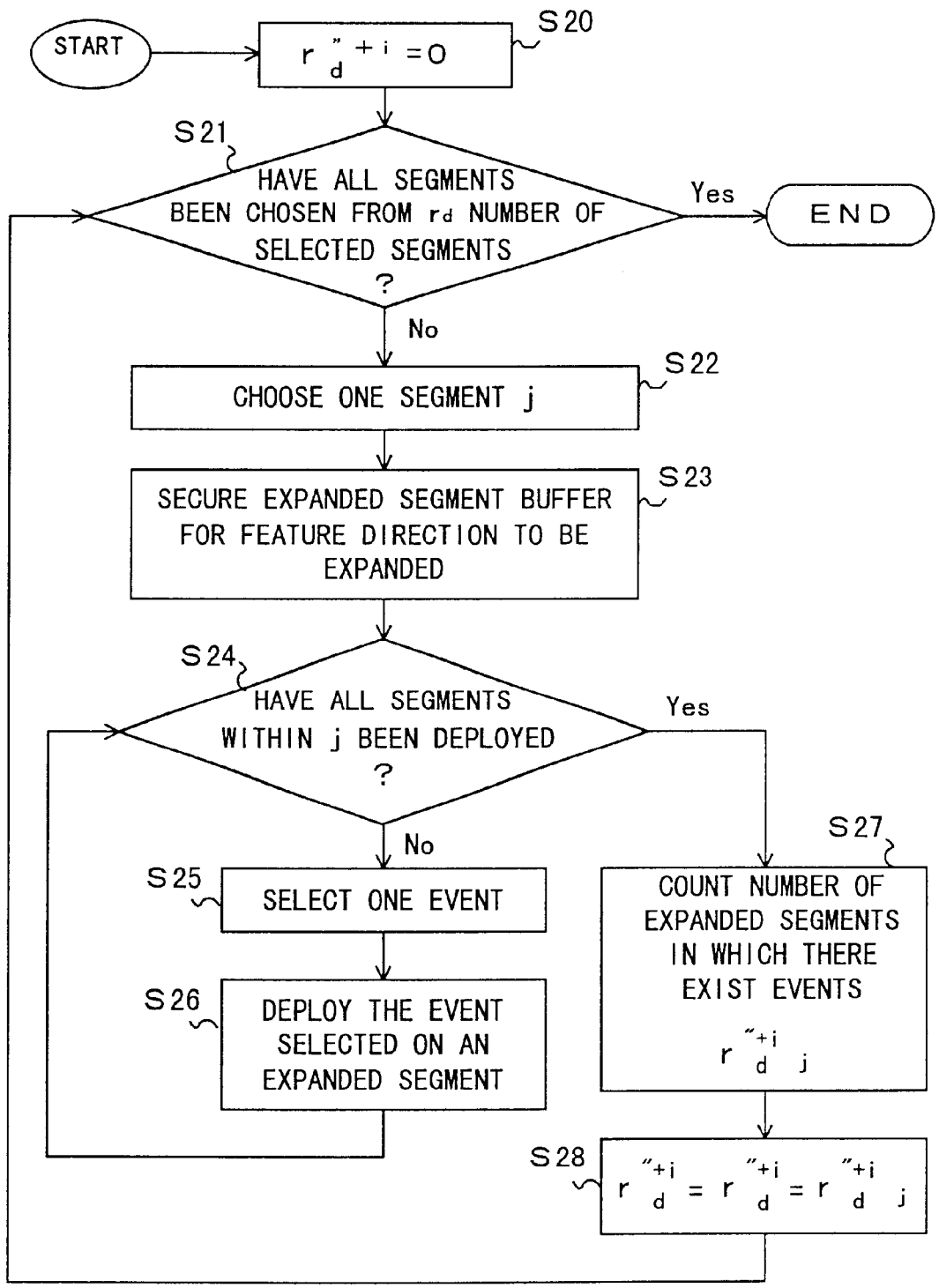
FIG. 10 is a flow chart describing a process for figuring a selected segment count, when a feature quantity is added.

FIG. 10 discloses a flow chart describing the processing required in step S15, which is shown in FIG. 9.

When changing the feature selection vectors and obtaining the evaluation values, a selected segment count must be calculated anew. Where features are deleted from the elements of the feature selection vectors (i.e., making "false" that which was "true"), the segment selection vectors, as above explained, can be easily obtained. When features are added (i.e., making "true" that which was "false"), however, the event distribution expands, because the feature spaces, also, expand. Accordingly, which of the segments are to be selected must be determined. It is FIG. 10 that discloses this processing.

First, $r_d^{+1}$, which establishes the selected segment count after the addition of features, is set to zero in step S20. Next, it is determined whether all the segments have been selected from the quantity $r_d$ segments chosen prior to the expansion of the feature selection spaces in step S21. Where the processing for all the segments has not been completed, the program moves to step S22 and selects one segment j. A segment buffer for the segments generated in the direction of the features that are to be expanded is secured in step S23. In step S24, it is determined whether all the events in j have been deployed in the direction of expansion. If not all processing has been completed, in step S25 one event is selected, and the selected event is deployed (disposed) on the expanded segments (step S26). Returning to step S24, this kind of deployment processing is executed for all events in the segment j. The events are then disposed on the expanded segments.

When the deployment of all the events in segment j is completed, the number $r_d^{+1j''}$ of expanded segments (segments added when the feature spaces are expanded in the direction of feature i) in which there exist events is counted in step S27. The value obtained in step S27 is then added to the selected segment count $r_d^{+1}$ in step S28. Then, returning to step S21, this processing is repeated for each of the $r_d$ number of selected segments, and the processing is brought to a close when the processing for all the segments has been completed. Here, the segments selected in step S22 are chosen, and the process of adding in step S28 corresponds to the execution of equation (2), previously cited.

Figure 11:
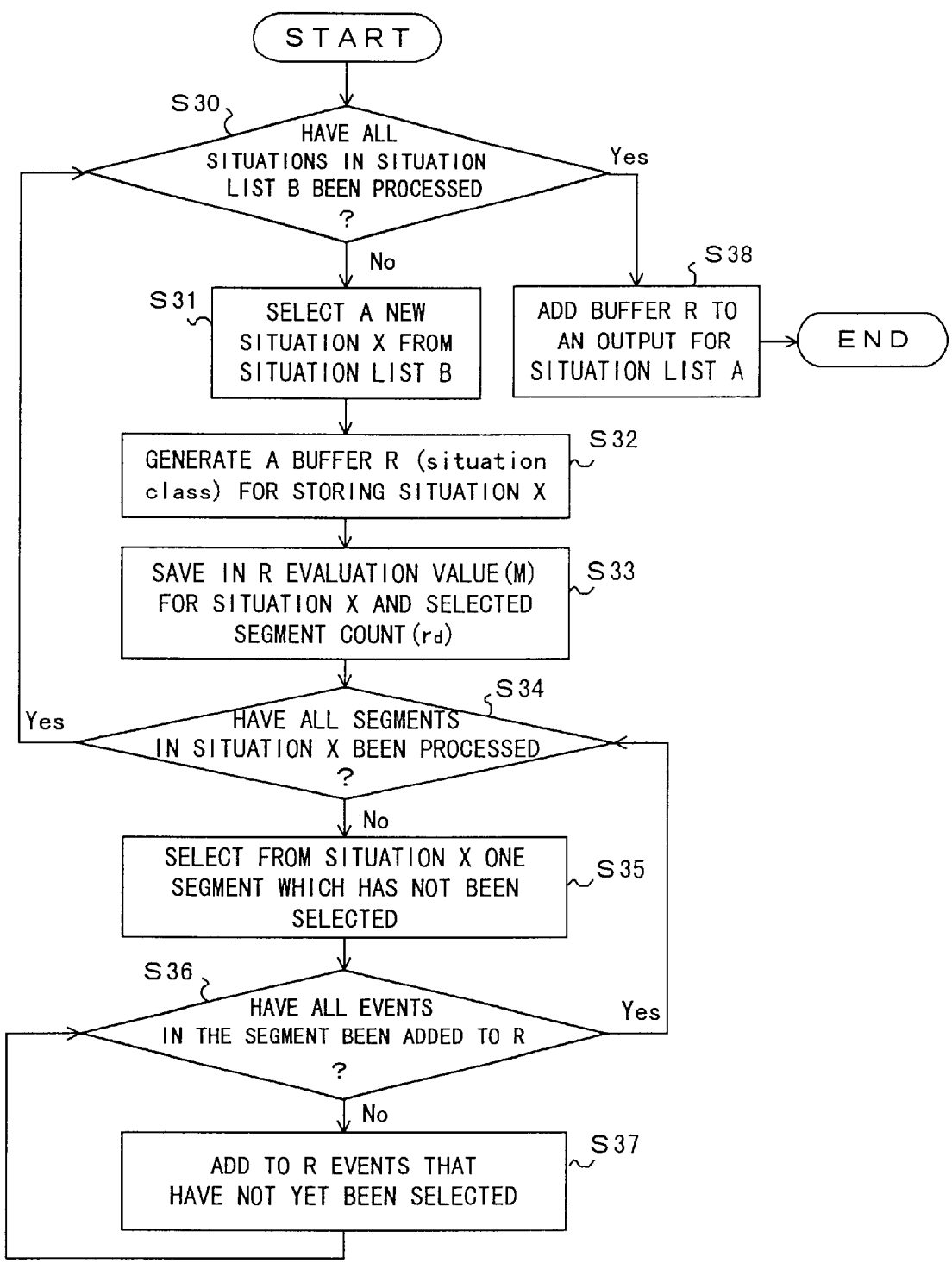
FIG. 11 is a flow chart describing a process for generating an output data list from the information obtained as a result of the software processing undertaken in the preferred embodiment of the present invention.

FIG. 11 describes the details of step S18, shown in FIG. 9.

First, it is determined in step S30 whether all the situations within the situation list B have been processed. At either the beginning of or at some intermediate point in the processing, the program proceeds to step S31. In step S31, a new situation X is selected from the situation list B. Next, a buffer R for holding the situation X is generated in step S32. This buffer is the class instance for the "situation" module. Step S33 saves in the buffer R, illustratively, the evaluation value M for situation X, and the selected segment count $r_d$.

It is determined in step S34 whether all the segments within the situation X have been processed. At either the beginning of or at some intermediate point in the processing, the program proceeds to step S35. In step35, one segment is chosen from the situation X, and it is determined whether all the events within the segment have been added to the buffer R. At either the beginning of or at some intermediate point in processing, the process moves to step S37, where an event is selected and added to the buffer R. The process moves to step S36, and, when all events within the selected segment have been added to the buffer R, the program returns to step S34, where it is determined whether all the segments within situation X have been processed. If processing Is incomplete, the processing pursuant to steps subsequent from S34 is repeated. When the processing for all the segments is completed, the program returns to step S30, where the processing is repeated until the above-described processing is completed for all the situations within the situation list B. When the processing for all the situations within the situation list B is completed, the program proceeds to step S38. There, the buffer R is added to the output for the situation list A, and the processing pursuant to step S18, shown in FIG. 9, is completed.

Figure 12:
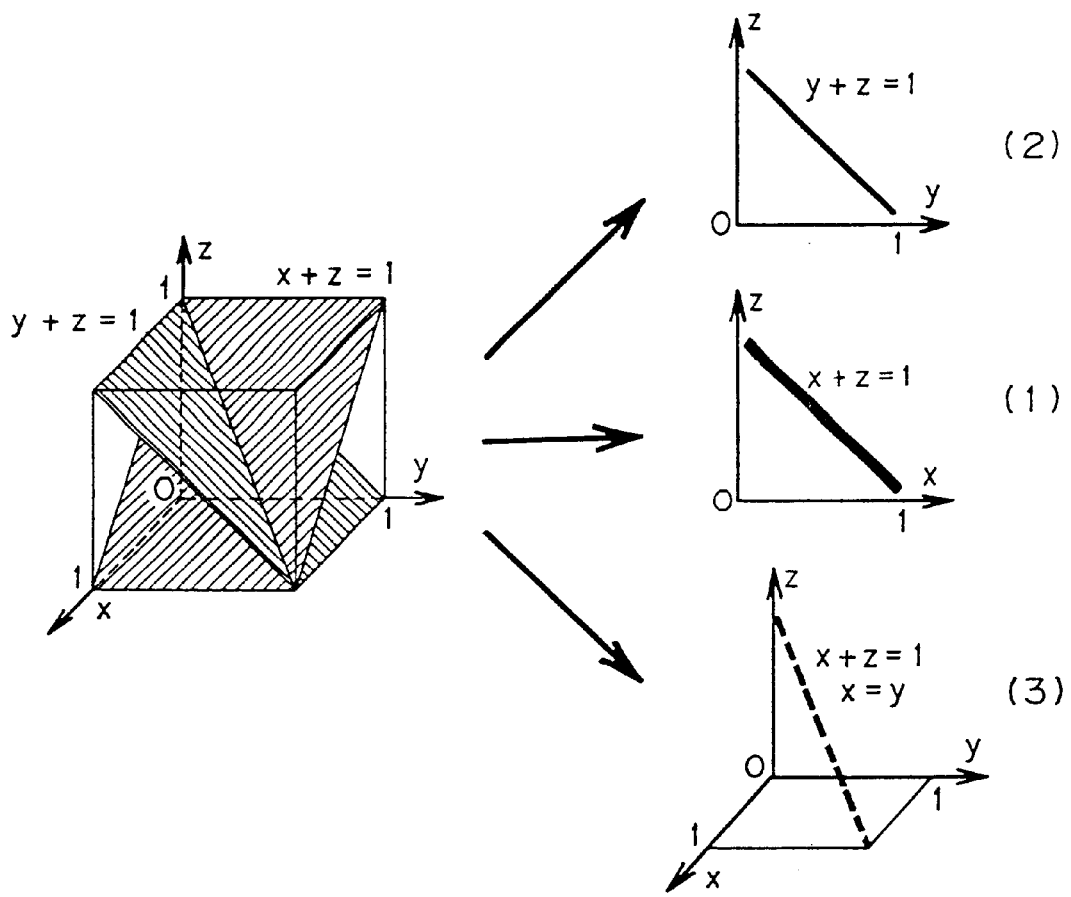
FIG. 12 discloses the operating test results (1 of 2) for the preferred embodiment of the present invention.

FIG. 12 and FIG. 13 disclose the results of practicing the technology of the illustrative embodiment for test data.

As to the inputted data, x, y, and z were adopted as three features, and events were disposed on this three-dimensional space, as shown on the right-hand side of FIG. 12. Events were disposed, illustratively, as follows: 11×11 in equal grid intervals of 0.1, on a plane x+y=1; and 11×11 in equal grid intervals of 0.1, on a plane x+z=1.

As concerns the processing results, three situations were extracted as situations bearing inter-data relevance, precisely as shown in FIG. 13. The M (matchability) situation 1 denotes the situation marked (1) in FIG. 12. The M situation 2 denotes the situation marked (2) in FIG. 12. The M situation 3 denotes the situation marked (3) in FIG. 12.

The processing in the illustrative embodiment was thus performed for test data demonstrating distinct inter-data relevance. The test succeeded not only in extracting the two planes in which the events were initially disposed, but also in extracting the intersection of the two planes.

The test demonstrated that, where processing pursuant to the illustrative embodiment is employed, it is possible to extract data possessed of mutual relevance.

Pursuant to the present invention, it is possible to extract from among data randomly accumulated data bearing mutual relationships as a partial data assembly that combines varieties of features possessed by the data and events (records) that indicate interrelationships. Further, it is possible automatically to perform the task of dividing problems.

Accordingly, the present invention is extremely effective also as an antecedent process to such processes as multivariable analysis, data mining, or pattern recognition, which extract some kind of regularity or feature from large quantities of data.

What is claimed is:

1. An apparatus for data decomposition that extracts partial data from whole data by selecting, with respect to each record and from data which catalog a plurality of attributes possessed by each record, a combination of each event corresponding to each record and a combination of feature quantities, which are said attributes, comprising:

a unit figuring evaluation values that become standards for ascertaining a relevance among data with respect to combinations of specific features and combinations of specific events; and a unit extracting a plurality of partial data for which an evaluation value becomes a maximum value with respect to both changes in combinations of features and changes in combinations of events, wherein the evaluation values are figured by including a selected event count, a total segment count in partial feature spaces that are to be selected, and a selected segment count in the partial feature spaces that are to be selected.

2. The apparatus for data decomposition according to claim 1, wherein said apparatus for data decomposition utilizes an evaluation function which increase monotonically with respect to the number of events selected, increases monotonically with respect to an all segment count in the partial feature spaces that are to be selected, and decreases monotonically with respect to a selected segment count in the partial feature spaces that are to be selected, and said apparatus for data decomposition extracts partial data corresponding to the maximum value for an evaluation value.

3. The apparatus for data decomposition according to claim 2, wherein the partial data corresponding to a minimum value are extracted utilizing an evaluation function in which increase/decrease relationship are inverted compared with said evaluation function.

4. An apparatus for data decomposition that extracts partial data from whole data by selecting, with respect to each record and from data which catalog a plurality of attributes possessed by each record, a combination of each event corresponding to each record and a combination of feature quantities, which are said attributes, comprising:

a unit figuring evaluation values that become standards for ascertaining a relevance among data with respect to combinations of specific features and combinations of specific events; and a unit extracting a plurality of partial data for which an evaluation value becomes a maximum value with respect to both changes in combinations of features and changes in combinations of events, wherein an evaluation value is figured using parameters comprising ratios of event counts included in the partial situations which are the partial data among whole data and are designated by selected events and selected features, average values for the selected event counts for each segment in the partial feature spaces, and space occupation ratios for the selected segment counts in the partial feature spaces, and wherein said apparatus for data decomposition utilizes an evaluation function which increases monotonically with respect to the ratio of event counts included in a partial situation, increases monotonically with respect to the average value of selected event counts for each segment in the partial feature spaces, and decreases monotonically with respect to the space occupation ratio of selected segment counts in the partial feature spaces, and said apparatus for data decomposition extracts the partial data corresponding to the maximum value for an evaluation value which is an output value of said evaluation function.

5. The apparatus for data decomposition according to claim 4, wherein the partial data corresponding to a minimum value are figured using an evaluation function in which increase/decrease relationships are inverted compared with said evaluation function.

6. The apparatus for data decomposition according to claim 4, wherein said apparatus for data decomposition uses $C_1$, $C_2$, $C_3$ as positive constants, n/N as a ratio of the number of events included in a partial situation, $n/r_d$ as an average value of the selected event counts for each segment in the partial feature spaces, $r_d/S_d$ as an occupation ratio for the selected segment counts in the partial feature spaces, and $$M(n, r_d, N) = C_1 \log \frac{n}{N} + C_2 \log \frac{n}{r_d} - C_3 \log \frac{r_d}{S_d}$$

or, $$M(n, r_d, S_d, N) = \log \frac{n^{C_1+C_2} S_d^{C_3}}{N^{C_1} r_d^{C_2+C_3}}$$

as said evaluation function.

7. The apparatus for data decomposition according to claim 6, wherein $C_1$, $C_2$, $C_3$ are set so that $C_1$=k, $C_2$=0.3k, and $C_3$=0.7k (k is a constant).

8. An apparatus for data decomposition that extracts partial data from whole data by selecting, with respect to each record and from data which catalog a plurality of attributes possessed by each record, a combination of each event corresponding to each record and a combination of feature quantities, which are said attributes, comprising:

a unit figuring evaluation values that become standards for ascertaining a relevance among data with respect to combinations of specific features and combinations of specific events;

a unit extracting a plurality of partial data for which an evaluation value becomes a maximum value with respect to both changes in combinations of features and changes in combinations of events;

a unit generating combinations of feature selections;

a unit searching for the extremal values of evaluation values according to changes in the combinations of events in specific partial feature spaces generated by the generating unit;

a unit confirming that the combinations of events that will become extremal values are extremal values with respect to minute changes in feature quantity selection directions; and a unit outputting results of the event and feature selections, which are extremal values with respect also to any change from said searching unit and said confirmation unit.

9. The apparatus for data decomposition according to claim 8, the searching unit searches by selecting and indirectly selecting events in the segment selection spaces designated by specific partial feature spaces generated by the generating unit.

10. The apparatus for data decomposition according to claim 9, wherein the segments comprising no events are not selected in segment selection.

11. The apparatus for data decomposition according to claim 9, wherein all events contained in the selected segments are selected.

12. The apparatus for data decomposition according to claim 9, wherein the segments with high event counts are selected preferentially.

13. A method for data decomposition that extracts partial data from whole data by selecting, with respect to each record and from data which catalog a plurality of attributes possessed by each record, a combination of each event corresponding to each record and a combination of feature quantities, which are said attributes, comprising:

calculating evaluation values that become standards for ascertaining the relevance among data with respect to combinations of specific features and combinations of specific events, and extracting a plurality of partial data for which an evaluation value becomes a maximum value with respect to both changes in combinations of features and changes in combinations of events, wherein the evaluation values are figured by including a selected event count, a total segment count in partial feature spaces that are to be selected, and a selected segment count in the partial feature spaces that are to be selected.

14. The method for data decomposition according to claim 13, wherein said method for data decomposition utilizes an evaluation function which increase monotonically with respect to a number of events selected, increases monotonically with respect to an all segment count in the partial feature spaces that are selected, and decreases monotonically with respect to a selected segment count in the partial feature spaces that are selected, and said method for data decomposition extracts the partial data corresponding to the maximum value for the evaluation value.

15. The method for data decomposition according to claim 14, wherein the partial data corresponding to a minimum value are extracted utilizing an evaluation function in which increase/decrease relationships are inverted compared with said evaluation function.

16. A method for data decomposition that extracts partial data from whole data by selecting, with respect to each record and from data which catalog a plurality of attributes possessed by each record, a combination of each event corresponding to each record and a combination of feature quantities, which are said attributes, comprising:

calculating evaluation values that become standards for ascertaining the relevance among data with respect to combinations of specific features and combinations of specific events, and extracting a plurality of partial data for which an evaluation value becomes a maximum value with respect to both changes in combinations of features and changes in combinations of events, wherein an evaluation value is figured using parameters comprising ratios of event counts included in partial situations which are partial data among whole data and are designated by selected events and selected features quantities, average values for selected event counts for each segment in the partial feature spaces, and space occupation ratios for selected segment counts in the partial feature spaces, wherein said method for data decomposition utilizes an evaluation function which increases monotonically with respect to the ratio of event counts included in a partial situation, increases monotonically with respect to the average value of selected event counts for each segment in the partial feature spaces, and decreases monotonically with respect to the space occupation ratio of selected segment counts in the partial feature spaces, and said method for data decomposition extracts the partial data corresponding to a maximum value for an evaluation value which is an output value of said evaluation function.

17. The method for data decomposition according to claim 16, wherein the partial data corresponding to a minimum value are figured using an evaluation function in which increase/decrease relationships are inverted compared with said evaluation function.

18. The method for data decomposition according to claim 16, wherein said method for data decomposition uses $C_1$, $C_2$, $C_3$ as positive constants, $n/N$ as a ratio of the number of events included in a partial situation, $n/r_d$ as an average value of the selected event counts for each segment in the partial feature spaces, $r_d/S_d$ as an occupation ratio for selected segment counts in the partial feature spaces, and $$M(n, r_d, S_d, N) = C_1 \log \frac{n}{N} + C_2 \log \frac{n}{r_d} - C_3 \log \frac{r_d}{S_d}$$

or, $$M(n, r_d, S_d, N) = \log \frac{n^{C_1 + C_s} S_d^{C_3}}{N^{C_1} r_d^{C_2 + C_3}}$$

as said evaluation function.

19. The method for data decomposition according to claim 18, wherein $C_1$, $C_2$, $C_3$ are set so that $C_1 = k$, $C_2 = 0.3k$, and $C_3 = 0.7k$ (k is a constant).

20. A method for data decomposition that extracts partial data from whole data by selecting, with respect to each record and from data which catalog a plurality of attributes possessed by each record, a combination of each event corresponding to each record and a combination of feature quantities, which are said attributes, comprising:

calculating evaluation values that become standards for ascertaining the relevance among data with respect to combinations of specific features and combinations of specific events, extracting a plurality of partial data for which an evaluation value becomes a maximum value with respect to both changes in combinations of features and changes in combinations of events, generating the combinations of feature selections;

searching for the extremal values of evaluation values according to changes in the combinations of events in specific partial feature spaces generated by the generating;

confirming that the combinations of events that will become extremal values are extremal values with respect to minute changes in the feature selection directions; and outputting results of event and feature selections, which are extremal values with respect also to any change from said searching and said confirming.

21. The method for data decomposition according to claim 20, wherein the searching searches for the extremal values by selecting and indirectly selecting events in the segment selection spaces designated by specific generated partial feature spaces.

22. The method for data decomposition according to claim 21, wherein the segments comprising no events are not selected in segment selection.

23. The method for data decomposition according to claim 21, wherein all events contained in the selected segments are selected.

24. The method for data decomposition according to claim 21, wherein the segments with high event counts are selected preferentially.

25. A computer-readable storage medium for extracting partial data from whole data by selecting, with respect to each record and from data which catalog a plurality of attributes possessed by each record, a combination of each event corresponding to each record and a combination of feature quantities, which comprise the attributes, causing a computer to perform a process comprising:

calculating evaluation values that become standards for ascertaining a relevance among data with respect to combinations of specific features and combinations of specific events; and extracting a plurality of partial data for which an evaluation value becomes a maximum value with respect to both changes in combinations of features and changes in combinations of events, wherein the evaluation values are figured by including a selected event count, a total segment count in partial feature spaces that are to be selected, and a selected segment count in the partial feature spaces that are to be selected.

26. The storage medium according to claim 25, wherein said storage medium makes the computer utilize an evaluation function which increase monotonically with respect to a number of events selected, increases monotonically with respect to an all segment count in the partial feature spaces that are to be selected, and decreases monotonically with respect to a selected segment count in the partial feature spaces that are to be selected, and said storage medium makes the computer extract the partial data corresponding to the maximum value for an evaluation value.

27. The storage medium according to claim 26, wherein the partial data corresponding to a minimum value are extracted utilizing an evaluation function in which increase/decrease relationships are inverted compared with said evaluation function.

28. A computer-readable storage medium for extracting partial data from whole data by selecting, with respect to each record and from data which catalog a plurality of attributes possessed by each record, a combination of each event corresponding to each record and a combination of feature quantities, which comprise the attributes, causing a computer to perform a process comprising:

calculating evaluation values that become standards for ascertaining a relevance among data with respect to combinations of specific features and combinations of specific events; and extracting a plurality of partial data for which an evaluation value becomes a maximum value with respect to both changes in combinations of features and changes in combinations of events, wherein an evaluation value is figured using parameters comprising ratios of event counts included in partial situations which are partial data among whole data and are designated by selected events and selected features, average values for selected event counts for each segment in the partial feature spaces, and space occupation ratios for selected segment counts in the partial feature spaces, and wherein said storage medium makes the computer utilize an evaluation function which increases monotonically with respect to the ratio of event counts included in a partial situation, increases monotonically with respect to the average value of selected event counts for each segment in the partial feature spaces, and decreases monotonically with respect to the space occupation ratio of selected segment counts in the partial feature spaces, and said storage medium makes the computer extract partial data corresponding to the maximum value for an evaluation value which is an output value of said evaluation function.

29. The storage medium according to claim 28, wherein the partial data corresponding to a minimum value are figured using an evaluation function in which increase/decrease relationships are inverted compared with said evaluation function.

30. The storage medium according to claim 28, wherein said storage medium makes the computer use $C_1$, $C_2$, $C_3$ as positive constants, $n/N$ as a ratio of the number of events included in a partial situation, $n/r_d$ as an average value of selected event counts for each segment in the partial feature spaces, $r_d/S_d$ as an occupation ratio for selected segment counts in the partial feature spaces, and $$M(n, r_d, S_d, N) = C_1 \log \frac{n}{N} + C_2 \log \frac{n}{r_d} - C_3 \log \frac{r_d}{S_d}$$

or, $$M(n, r_d, S_d, N) = \log \frac{n^{C_1+C_2} S_d^{C_3}}{N^{C_1} r_d^{C_2+C_3}}$$

as said evaluation function.

31. The storage medium according to claim 30, wherein $C_1$, $C_2$, $C_3$ are set so that $C_1=k$, $C_2=0.3k$, and $C_3=0.7k$ (k is a constant).

32. A computer-readable storage medium for extracting partial data from whole data by selecting, with respect to each record and from data which catalog a plurality of attributes possessed by each record, a combination of each event corresponding to each record and a combination of feature quantities, which comprise the attributes, causing a computer to perform a process comprising:

calculating evaluation values that become standards for ascertaining a relevance among data with respect to combinations of specific features and combinations of specific events;

extracting a plurality of partial data for which an evaluation value becomes a maximum value with respect to both changes in combinations of features and changes in combinations of events;

generating combinations of feature quantity selections;

searching for extremal values of evaluation values according to changes in the combinations of events in specific partial feature spaces generated by the generating function;

confirming that the combinations of events that will become extremal values are extremal values with respect to minute changes in the feature selection directions; and outputting results of event and feature selections, which are extremal values with respect also to any change from said searching function and said confirming function.

33. The storage medium according to claim 32, wherein said searching function searches for the extremal values of evaluation values according to changes in the event combinations by selecting and indirectly selecting events in the segment selection spaces designated by specific generated partial feature spaces.

34. The storage medium according to claim 33, wherein the segments comprising no events are not selected in segment selection.

35. The storage medium according to claim 33, wherein all events contained in the selected segments are selected.

36. The storage medium according to claim 33, wherein the segments with high event counts are selected preferentially.

* * * * *